United States Patent
Agiwal et al.

(10) Patent No.: US 10,219,247 B2
(45) Date of Patent: Feb. 26, 2019

(54) METHOD AND SYSTEM FOR PREVENTING OVERLAP BETWEEN RECEPTION AND TRANSMISSION BY USER EQUIPMENT IN WIRELESS COMMUNICATION SYSTEM

(71) Applicant: Samsung Electronics Co., Ltd., Suwon-si, Gyeonggi-do (KR)

(72) Inventors: Anil Agiwal, Suwon-si (KR); Hyun-Seok Ryu, Yongin-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 534 days.

(21) Appl. No.: 14/791,861

(22) Filed: Jul. 6, 2015

(65) Prior Publication Data
US 2016/0007400 A1 Jan. 7, 2016

(30) Foreign Application Priority Data

Jul. 4, 2014 (IN) ............... 3321/CHE/2014
Feb. 13, 2015 (IN) ............... 3321/CHE/2014

(51) Int. Cl.
*H04W 72/02* (2009.01)
*H04W 8/00* (2009.01)
*H04W 72/04* (2009.01)

(52) U.S. Cl.
CPC ........... *H04W 72/02* (2013.01); *H04W 8/005* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2013/0188546 A1* | 7/2013 | Turtinen | H04W 8/005 370/312 |
| 2015/0036601 A1* | 2/2015 | Kim | H04L 5/0048 370/329 |
| 2015/0173048 A1 | 6/2015 | Seo et al. | |
| 2015/0296443 A1 | 10/2015 | Lim et al. | |
| 2016/0255670 A1* | 9/2016 | Lee | H04W 76/14 370/329 |
| 2016/0360541 A1* | 12/2016 | Kim | H04W 72/0406 |
| 2017/0027013 A1* | 1/2017 | Kim | H04W 72/04 |

(Continued)

FOREIGN PATENT DOCUMENTS

| WO | 2013-025057 A2 | 2/2013 |
|---|---|---|
| WO | 2013-191360 A1 | 12/2013 |

OTHER PUBLICATIONS

"Discussion on the multiplexing of D2D and cellular signals", 3GPP TSG RAN WG1 Meeting #76, R1-140401.

(Continued)

*Primary Examiner* — Gregory B Sefcheck
(74) *Attorney, Agent, or Firm* — Jefferson IP Law, LLP

(57) ABSTRACT

A communication method of a user equipment (UE) in a wireless communication system is provided. The method includes determining overlap in a time domain between data reception by the UE in a subframe and data transmission by the UE in an immediate subsequent subframe, and dropping, when the overlap is determined, one of the data reception in the subframe and the data transmission in the immediate subsequent subframe.

10 Claims, 6 Drawing Sheets

(56) References Cited

U.S. PATENT DOCUMENTS

2017/0055275 A1* 2/2017 Lee .................... H04W 76/14

OTHER PUBLICATIONS

"Impact of D2D transmission on the existing cellular system", 3GPP TSG RAN WG1 Meeting #76, R1-140211.
LG Electronics, D2D Discovery Signal Transmission Timing, 3GPP TSG RAN WG1 Meeting #76, R1-140339 Feb. 10-14, 2014, pp. 1-11, Prague, Czech Republic.
Intel Corporation, Analysis of Mutual Impact of WAN and D2D Communication, 3GPP TSG RAN WG1 Meeting #77, R1-142685, May 19-23, 2014, pp. 1-7, Seoul, Korea.
Catt, The Value of T2 for D2D Transmission Timing, 3GPP TSG RAN WG1 Meeting #76, R1-140099, Feb. 10-14, 2014, pp. 1-4, Prague, Czech Republic.
European Search Report dated Jan. 26, 2018 issued in the European Application No. 15814336.2-1215.

* cited by examiner

METHOD AND SYSTEM FOR PREVENTING OVERLAP BETWEEN RECEPTION AND TRANSMISSION BY USER EQUIPMENT IN WIRELESS COMMUNICATION SYSTEM

CROSS-REFERENCE TO RELATED APPLICATION(S)

This application claims the benefit under 35 U.S.C. § 119(a) of an Indian provisional patent application filed on Jul. 4, 2014 in the Indian Intellectual Property Office and assigned Serial number 3321/CHE/2014, and an Indian patent application filed on Feb. 13, 2015 in the Indian Intellectual Property Office and assigned Serial number 3321/CHE/2014, the entire disclosure of each of which is hereby incorporated by reference.

TECHNICAL FIELD

The present disclosure relates to an apparatus and a method for preventing overlap in wireless communication systems. More particularly, the present disclosure relates to a method for preventing overlap between data reception in a time period and data transmission in a next time period in a wireless communication system.

BACKGROUND

During device-to-device (D2D) communication, a discovery-related D2D user equipment (UE) receives discovery signals from other D2D UEs. The term "discovery" refers to a procedure in which a D2D UE determines whether there are other nearby D2D UEs. Further, the D2D UE is associated with D2D data communication and receives D2D data signals transmitted from one or more D2D UEs. Further, the D2D UE may receive both discovery signals and D2D data signals.

Further, a D2D UE located in network coverage uses a downlink (DL) timing to receive discovery signals from other D2D UE(s). The DL timing is a timing for signals received on DL from a serving base station (BS). The D2D UE in the network coverage uses a scheduling allocation timing that proceeds as long as a timing advance received from a scheduling assignment (SA) to receive D2D data signals. In order to receive a D2D data signal, the D2D UE first receives an SA transmitted from a transmitting D2D UE and receives a D2D data signal in a subframe indicated.

Further, the D2D UE is associated with D2D data communication and transmits D2D data signals. The D2D UE communicates with the serving BS to transmit wide area network (WAN) data to the serving BS. Further, the D2D UE is associated with D2D discovery (e.g., 2B-type discovery) and transmits D2D discovery signals using dedicated resources allocated by the BS while linked to the BS.

For example, the D2D UE transmits WAN data to the BS, and in order to transmit D2D discovery signals, uses a DL timing that lasts as long as a timing advance provided from the BS.

During D2D communication between two UEs, when a UE performs reception in a subframe (e.g., subframe n) at a carrier frequency and performs transmission in a next subframe (e.g., subframe n+1), overlap occurs in the time domain. Here, the subframe is a transmission time interval on the carrier frequency where the UE performs transmission/reception. Further, the reception in subframe n includes one of reception of D2D data and a D2D discovery signal. Meanwhile, the transmission in subframe n+1 includes one of transmission of D2D data, uplink transmission to the BS, and transmission of a D2D discovery signal. The reception in subframe n may be interfered by the transmission in subframe n+1 due to the overlap.

Therefore, a need exists for a method and an apparatus for preventing overlap between data reception in a time period and data transmission in a next time period in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for preventing overlap between data reception in a time period and data transmission in a next time period in a wireless communication system.

Another aspect of the present disclosure is to provide a method and an apparatus for preventing overlap between reception and transmission by a user equipment (UE) in a wireless communication system.

Another aspect of the present disclosure is to provide a method and an apparatus for detecting overlap in the time domain between reception in a subframe and transmission in a next subframe in a wireless communication system.

Another aspect of the present disclosure is to provide a method and an apparatus for dropping one of reception in a subframe or transmission in a next subframe upon detecting overlap in a wireless communication system.

Another aspect of the present disclosure is to provide a method and an apparatus for determining whether duration of a wireless transmission gap is less than a summation of a timing advance and a switch time from reception to transmission for transmission in a next subframe.

In accordance with an aspect of the present disclosure, a communication method of a UE in a wireless communication system is provided. The method includes determining overlap in a time domain between data reception by the UE in a subframe and data transmission by the UE in an immediate subsequent subframe, and dropping, when the overlap is determined, one of the data reception in the subframe and the data transmission in the immediate subsequent subframe.

In accordance with another aspect of the present disclosure, a UE configured to prevent overlap between reception and transmission in a wireless communication system is provided. The UE includes a controller configured to determine overlap in a time domain between data reception by the UE in a subframe and data transmission by the UE in an immediate subsequent subframe, and drop, when the overlap is determined, one of the data reception in the subframe and the data transmission in the immediate subsequent subframe.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
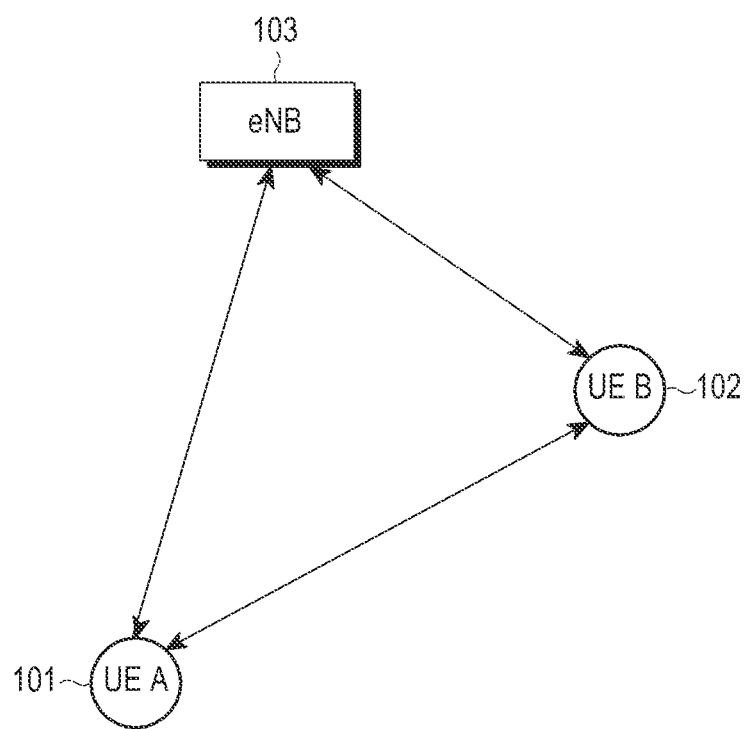
FIG. 1A illustrates a user equipment (UE) performing device-to-device (D2D) communication according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure described herein do not necessarily exclude each other. Some embodiments may be combined with one or more other embodiments to configure a new embodiment. As used herein, the term "or" denotes being non-exclusive unless stated otherwise.

According to an embodiment of the present disclosure, a method and an apparatus for preventing overlap between data reception in a time period and data transmission in a next time period in a wireless communication system are provided.

A basic concept of an embodiment of the present disclosure is to, when a user equipment (UE) receives data in a time period and transmits data in a subsequent, consecutive time period, and the reception and transmission overlap each other, drop or skip one of the data reception in the time period and the data transmission in the next time period. Hereinafter, the term "drop" or "skip" is collectively referred to as "drop."

Hereinafter, the description primarily focuses on a device-to-device (D2D) communication system for ease of description. However, the present disclosure is not intended to be limited to the D2D communication system, and rather may apply to general wireless communication systems as well.

According to an embodiment of the present disclosure, a method and an apparatus for preventing overlap between reception and transmission by a UE for D2D communication are provided. First, overlap in the time domain between reception in a subframe and transmission in a subframe immediately after the subframe is detected. The subframe is a transmission time interval on a carrier frequency where communication is performed by the UE.

The transmission includes one of transmission of D2D data, uplink transmission to a base station (BS) (also referred to as an evolved Node B (eNB)), and transmission of a D2D discovery signal. The reception includes reception of D2D data or reception of a D2D discovery signal.

When a subframe is scheduled for reception of a D2D discovery signal, and transmission is scheduled in an immediate subsequent subframe, if the time of the D2D transmission gap is less than a summation of a timing advance (TA) for transmission in the immediate subsequent subframe and a switch time from reception to transmission for the data transmission in the immediate subsequent subframe, overlap is detected.

Here, the D2D transmission gap is a time set to prevent data from being communicated at an end of a subframe in which communication is scheduled. For example, when one subframe time is 1000 micro seconds, and the D2D transmission gap is set to 100 micro seconds, the D2D transmission is performed only in first 900 micro seconds of the overall subframe. The last 100 micro seconds serves as the D2D transmission gap.

In relation to the "switch time from reception to transmission" for the data transmission in the immediate subsequent subframe, the D2D UE, when transmitting data after receiving data, requires a time for switching a data reception mode to a data transmission mode. This is denoted the "switch time from reception to transmission," and as an example, the switch time may be 20 s.

Meanwhile, when a subframe is scheduled for reception of D2D data, and transmission is scheduled in an immediate subsequent subframe, if the time of the start of transmission in the immediate subsequent subframe is less than {reception start time for reception of D2D in the subframe+length of the subframe−D2D transmission gap time+switch time from reception to transmission for the data transmission in the immediate subsequent subframe}, overlap is detected.

As described above, after overlap is detected, one of reception in the subframe or transmission in the immediate subsequent subframe is dropped.

Here, dropping the D2D data reception in the subframe is based on the priority of transmission in the immediate subsequent subframe. For example, the uplink transmission to the BS may be higher in priority than the D2D data reception.

Further, dropping the discovery signal in the subframe is based on the priority of transmission in the immediate subsequent subframe. For example, the uplink transmission to the BS may be higher in priority than reception of the D2D discovery signal.

According to an embodiment of the present disclosure, the D2D UE, after detecting overlap between D2D reception in one subframe and uplink transmission in an immediate subsequent subframe, drops the D2D reception in the subframe (i.e., D2D data or D2D discovery signal).

As such, according to an embodiment of the present disclosure, one of reception in the subframe or transmission in the immediate subsequent subframe is dropped, preventing overlap between the reception in the subframe and the transmission in the immediate subsequent subframe.

Hereinafter, various embodiments of the present disclosure are described in detail with reference to FIGS. 1A to 7. Here, the same reference denotations refer to the same corresponding features throughout the specification and the drawings.

FIG. 1A illustrates a UE performing D2D communication according to an embodiment of the present disclosure.

Referring to FIG. 1A, as used herein, the UE may be, e.g., a cellular phone, a smartphone, a wireless electronic scheduler, a personal digital assistant (PDA), a tablet personal computer (PC), or a portable wireless communication device.

It is assumed in connection with FIG. 1A that while a UE A 101 communicates with a UE B 102, UE B 102 receives D2D data from UE A in subframe n and transmits one of D2D data, uplink data to a BS 103, or a D2D discovery signal in an immediate subsequent subframe, i.e., subframe n+1.

Figure 1B:
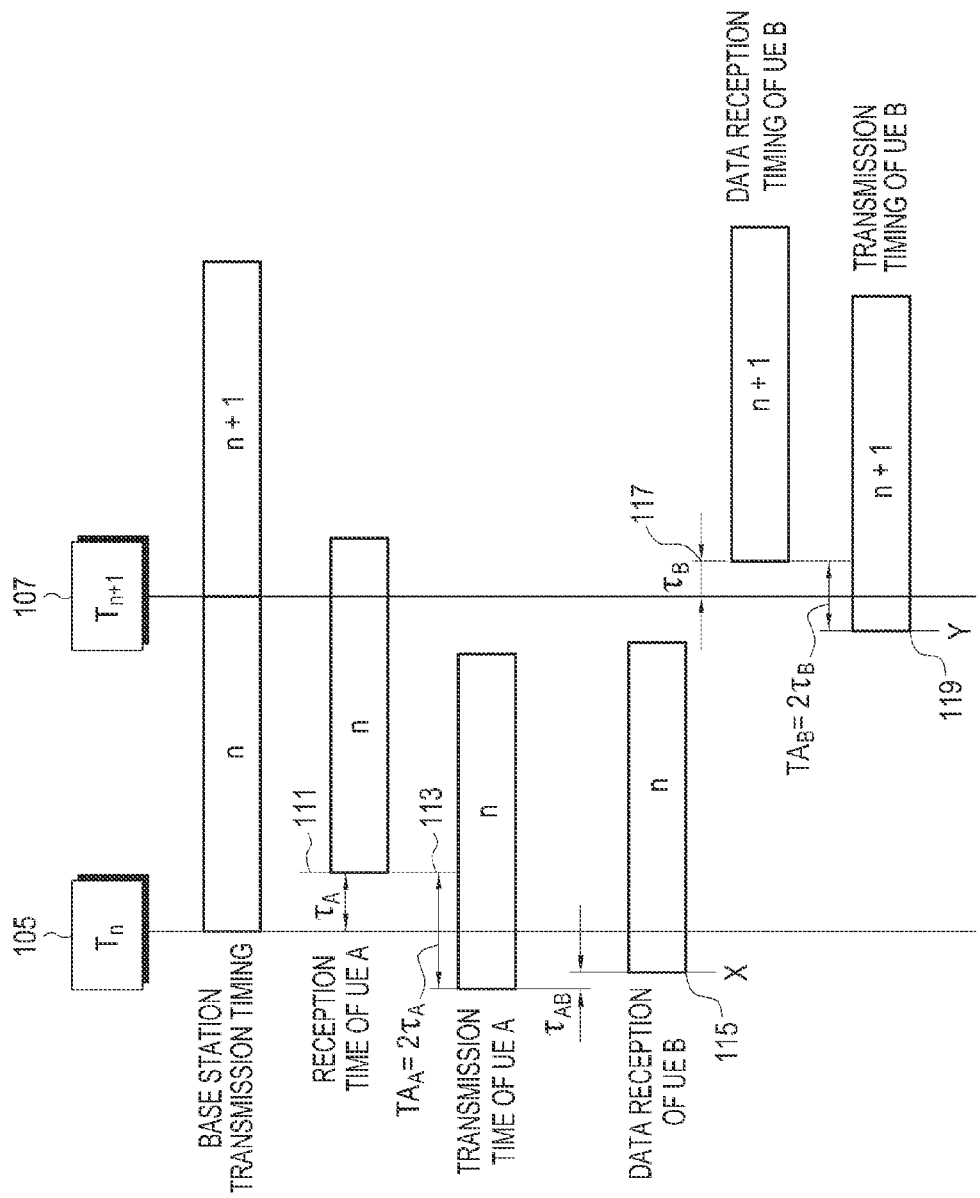
FIG. 1B illustrates a data communication time of a UE when the UE communicates with another UE according to an embodiment of the present disclosure.

FIG. 1B illustrates a data communication time of a UE when the UE communicates with another UE according to an embodiment of the present disclosure.

Referring to FIG. 1B, transmission (TX)/reception (RX) reference timings of the BS 103 n subframe n and subframe n+1 are $T_n$ 105 and $T_{n+1}$ 107, respectively. Meanwhile, it is assumed that a propagation delay between UE A 101 and the BS 103 is $T_A$, a propagation delay between UE B 102 and the BS 103 is $T_B$, and a propagation delay between UE A 101 and UE B 102 is $T_{AB}$.

Under such assumption, referring to FIG. 1B, after the BS 103 transmits, to UE A 101, scheduling assignment (SA) information including a $TA_A$ value of UE A 101, a time 111 when UE A 101 starts to receive the SA information transmitted from the BS 103 is $T_n$ 105+$T_A$. A data transmission time 113 of UE A 101 is 111+$TA_A$. $TA_A$ is a TA of UE A 101, and $TA_A$ is assumed to be −2 $T_A$. When UE A 101 transmits D2D data to UE B 102 at time 113, a D2D data reception start time X 115 of UE B 102 is 113+$T_{AB}$.

In another approach, the D2D data reception start time X 115 of UE B 102 may also be determined to be $T_n$ 105+$TA_B$.

$TA_B$ is a TA value for UE B 102, and this may be included in the SA information of the BS 103.

Meanwhile, assuming that UE B 102 receives data transmitted from the BS 103 in subframe n+1, that is, when the BS 103 transmits data to UE B 102 at $T_{n+1}$ 107, the time 117 when UE B 102 starts to receive the data transmitted from the BS 103 is $T_{n+1}$ 107+$T_B$, and the time Y 119 when UE B 102 starts to transmit data is 117+$TA_B$. Here, $TA_B$ is assumed to be −2 $T_B$. $TA_B$ may be included in the SA information that is transmitted from the BS 103 as a TA for UE B 102.

Meanwhile, given the above-described D2D transmission gap and switch time, UE B 102 might transmit data the switch time after the elapse of the time when data is actually received of one subframe time (e.g., 1 ms) after starting to receive data at time X 115. Taking this into consideration, if transmission start time Y 119 of UE B 102 in subframe n+1 is less than {reception start time Y 119 of UE B 102 in subframe n+one subframe time length−D2D transmission gap+switch time}, UE B 102, after receiving data in subframe n, cannot transmit data in subframe n+1.

For example, assuming that one subframe, transmission gap, and switch time, respectively, are set to 1000 us, 100 us, and 20 us, and X=1000 us and Y=1910 us, Y=1910<{X (=1000)+1 subframe length (=1000)−transmission gap (=100)+switch time (20)}=1920, and in this case, no transmission can be performed in subframe n+1. In other words, when data is transmitted in the subframe (i.e., subframe n+1) immediately after data is received in subframe n, overlap occurs.

Figure 2:
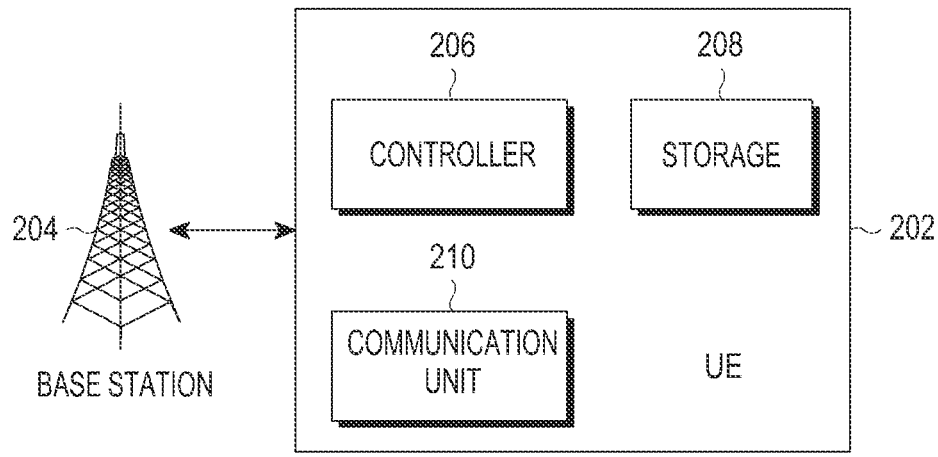
FIG. 2 illustrates a configuration of a UE to prevent overlap between reception and transmission upon D2D communication according to an embodiment of the present disclosure.

FIG. 2 illustrates a configuration of a UE to prevent overlap between reception and transmission upon D2D communication according to an embodiment of the present disclosure.

Referring to FIG. 2, a UE 202 communicates with a BS 204. The UE 202 includes a controller 206, a storage 208, and a communication unit 210.

According to an embodiment of the present disclosure, the storage 208 may store data generated by the controller 206 and may provide stored data to the controller 206.

The communication unit 210 enables the UE 202 to communicate with the BS 204, and the communication unit 210 transmits data to the BS 204 and receives data from the BS 204.

The controller 206 performs the overall operation according to an embodiment of the present disclosure. As an example, the controller 206 determines whether overlap occurs in the time domain between data reception in one subframe and data transmission in an immediate subsequent subframe, and when overlap occurs, drops one of the data reception in the subframe and the data transmission in the immediate subsequent subframe.

In other words, when reception of a D2D discovery signal is scheduled in subframe n, and transmission is scheduled in subframe n+1, the controller 206 determines whether the time of the D2D time gap is less than {switch time+TA value for transmission in subframe n+1} to detect whether overlap occurs. For example, when a result of the examination shows that the D2D time gap is less than the summation, the controller 206 determines that overlap occurs between the data reception and the data transmission.

Further, when subframe n is scheduled for reception of D2D data, and transmission is scheduled in subframe n+1, the controller 206 determines whether the transmission start time in subframe n+1 is less than {reception start time for reception of the D2D data in subframe n+subframe length−D2D transmission gap time+switch time from reception to transmission for the data transmission in subframe n+1} to detect overlap. For example, when a result of the examination shows that the transmission start time is less than {reception start time for reception of the D2D data in subframe n+subframe length−D2D transmission gap time+switch time from reception to transmission for the data transmission in subframe n+1}, the controller 206 determines that overlap occurs between the data reception and the data transmission.

Here, the reception start time for the reception in subframe n may be determined as a time that is advanced as long as the TA value indicated in the SA information from the time when the SA information is received from the BS or as a time that is advanced as long as the TA from the downlink (DL) timing. Meanwhile, the start time for transmission in subframe n+1 may be determined by advancing the DL timing as long as the TA of the UE 202 for the BS 204.

For reference, as described above, the D2D transmission gap time is a time set so that no data communication is performed at an end of the subframe where communication is scheduled. The D2D transmission gap time may be pre-defined and stored in the storage 208. The "switch time from reception to transmission" is a time for switching the data reception mode to the data transmission mode when the D2D UE transmits data after receiving data.

When the reception in the current subframe and the transmission in the immediate subsequent subframe are determined to overlap each other, the controller 206 may drop one of the reception in the current subframe or the transmission in the immediate subsequent subframe.

In an embodiment of the present disclosure, which one of the reception of D2D data in subframe n and the transmission in subframe n+1 is dropped may be determined based on the priority of the transmission of D2D data in subframe n and the data transmission in subframe n+1. For example, uplink transmission to the BS may have a higher priority than the reception of D2D data. Specifically, when transmission of a hybrid automatic repeat request (HARQ) acknowledgement (ACK)/negative ACK (HACK) to the BS is scheduled in subframe n+1, the controller 206 may drop the reception of D2D data in subframe n.

In an embodiment of the present disclosure, which one of the reception of D2D discovery signal in subframe n and the transmission in subframe n+1 is dropped may be determined based on the priority of the transmission of D2D discovery signal in subframe n and the data transmission in subframe n+1. For example, uplink transmission to the BS may have a higher priority than the reception of discovery signal. Specifically, when HARQ ACK/NACK transmissions are scheduled in subframe n+1, the reception of discovery signal in subframe n may be dropped.

As described above, dropping one of the reception in subframe n or transmission in subframe n+1 may prevent overlap between the reception and the transmission.

Although FIG. 2 illustrates a limited overview of the UE 202, it should be noted that other embodiments of the present disclosure are not limited thereto. The labels respectively assigned to the modules or components are provided merely for the purpose of illustration, and are not intended to limit the scope of the present disclosure. Further, one or more modules may be combined or separated from each other to perform similar or substantially similar functions without departing from the scope of the present disclosure. Further, the UE 202 may include other various modules or components that are mutually operated locally or remotely with other hardware or software components communicating with each other. For example, the components may include, a process, an object, an executable process, a thread of executions, a program or a computer executed on a controller or processor.

Figure 3:
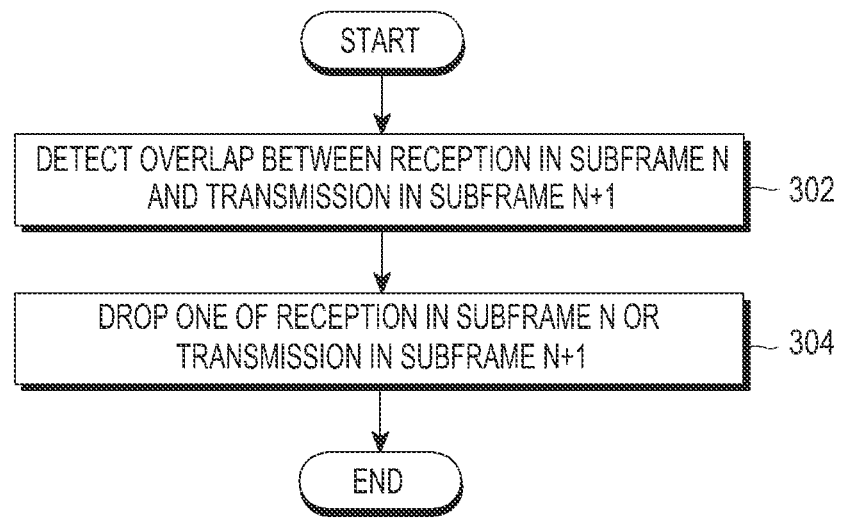
FIG. 3 illustrates a method for preventing overlap between reception and transmission by a UE upon D2D communication according to an embodiment of the present disclosure.

FIG. 3 illustrates a method for preventing overlap between reception and transmission by a UE upon D2D communication according to an embodiment of the present disclosure.

Referring to FIG. 3, in operation 302, overlap between reception in subframe n and transmission in subframe n+1 is detected. The transmission includes one of transmission of D2D data, uplink transmission to a BS, and transmission of a D2D discovery signal. The reception includes one of reception of D2D data or reception of a D2D discovery signal.

When reception of a D2D discovery signal is scheduled in subframe n, and transmission is scheduled in subframe n+1, the controller 206 may determine whether the time of a D2D transmission gap is less than {switch time+TA value for transmission in subframe n+1} to detect whether overlap occurs. For example, when a result of the examination shows that the D2D time gap is less than the summation, the controller 206 determines that overlap occurs between the data reception and the data transmission.

Further, when subframe n is scheduled for reception of D2D data, and transmission is scheduled in subframe n+1, the controller 206 determines whether the transmission start time in subframe n+1 is less than {reception start time for reception of the D2D data in subframe n+subframe length−D2D transmission gap time+switch time from reception to transmission for the data transmission in subframe n+1} to detect overlap. For example, when a result of the examination shows that the transmission start time is less than {reception start time for reception of the D2D data in subframe n+subframe length−D2D transmission gap time+switch time from reception to transmission for the data transmission in subframe n+1}, the controller 206 determines that overlap occurs between the data reception and the data transmission.

Here, the reception start time for the reception in subframe n may be determined as a time that is advanced as long as the TA value indicated in the SA information from the time when the SA information is received from the BS or as a time that is advanced as long as the TA from the DL timing. Meanwhile, the start time for transmission in subframe n+1 may be determined by advancing the DL timing as long as the TA of the UE 202 for the BS 204.

When overlap is detected in operation 302, one of the reception in subframe n or the transmission in subframe n+1 may be dropped in operation 304.

In an embodiment of the present disclosure, which one of the reception of D2D data in subframe n and the transmission in subframe n+1 is dropped may be determined based on the priority of the transmission of D2D data in subframe n and the data transmission in subframe n+1. For example, uplink transmission to the BS may have a higher priority than the reception of D2D data. Specifically, when transmission of an HARQ ACK/NACK to the BS is scheduled in subframe n+1, the controller 206 may drop the reception of D2D data in subframe n.

In an embodiment of the present disclosure, which one of the reception of D2D discovery signal in subframe n and the transmission in subframe n+1 is dropped may be determined based on the priority of the transmission of D2D discovery signal in subframe n and the data transmission in subframe n+1. For example, uplink transmission to the BS may have a higher priority than the reception of discovery signal. Specifically, when HARQ ACK/NACK transmissions are scheduled in subframe n+1, the reception of discovery signal in subframe n may be dropped.

Various operations, executions, or blocks of the method may be performed in the suggested order or a different order or simultaneously. Further, in some embodiments of the present disclosure, some operations, executions, or blocks may be omitted, added or modified without departing from the scope of the present disclosure.

Figure 4:
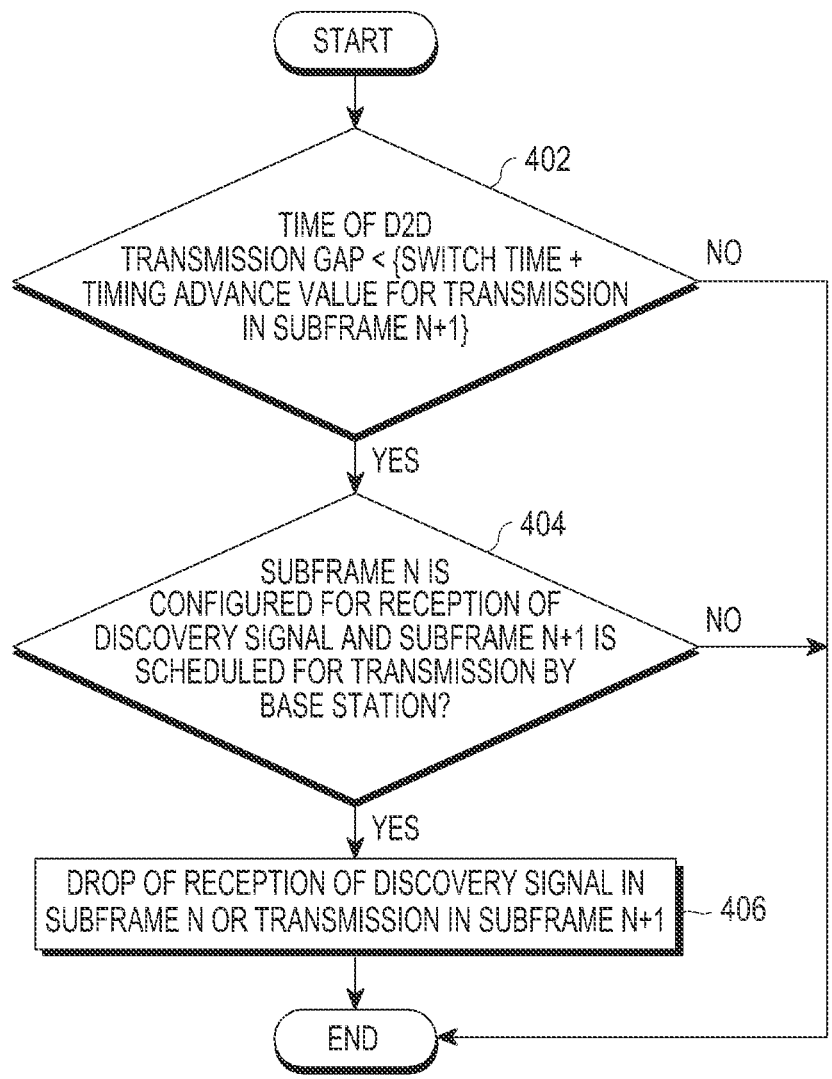
FIG. 4 illustrates a method for preventing overlap between reception and transmission of a discovery signal by a UE for D2D communication according to an embodiment of the present disclosure.

FIG. 4 illustrates a method for preventing overlap between reception and transmission of a discovery signal by a UE for D2D communication according to an embodiment of the present disclosure.

Transmission by a UE 202 includes one of transmission of D2D data, uplink transmission to the BS, and transmission of a D2D discovery signal.

Referring to FIG. 4, in operation 402, it is determined whether the time of a D2D transmission gap is less than {switch time+TA value for transmission in subframe n+1} in operation 402. When the time of the D2D transmission gap is less than {switch time+TA value for transmission in subframe n+1}, it is determined in operation 404 whether subframe n is configured for reception of a discovery signal and subframe n+1 is scheduled for transmission by the BS.

In an embodiment of the present disclosure, when subframe n is configured for reception of the discovery signal, the reception of the discovery signal in subframe n or transmission in subframe n+1 may be dropped in operation 406. In an embodiment of the present disclosure, the method may be performed by the controller 206.

Various operations, executions, or blocks of the method may be performed in the suggested order or a different order or simultaneously. Further, in some embodiments of the present disclosure, some operations, executions, or blocks may be omitted, added or modified without departing from the scope of the present disclosure.

Figure 5:
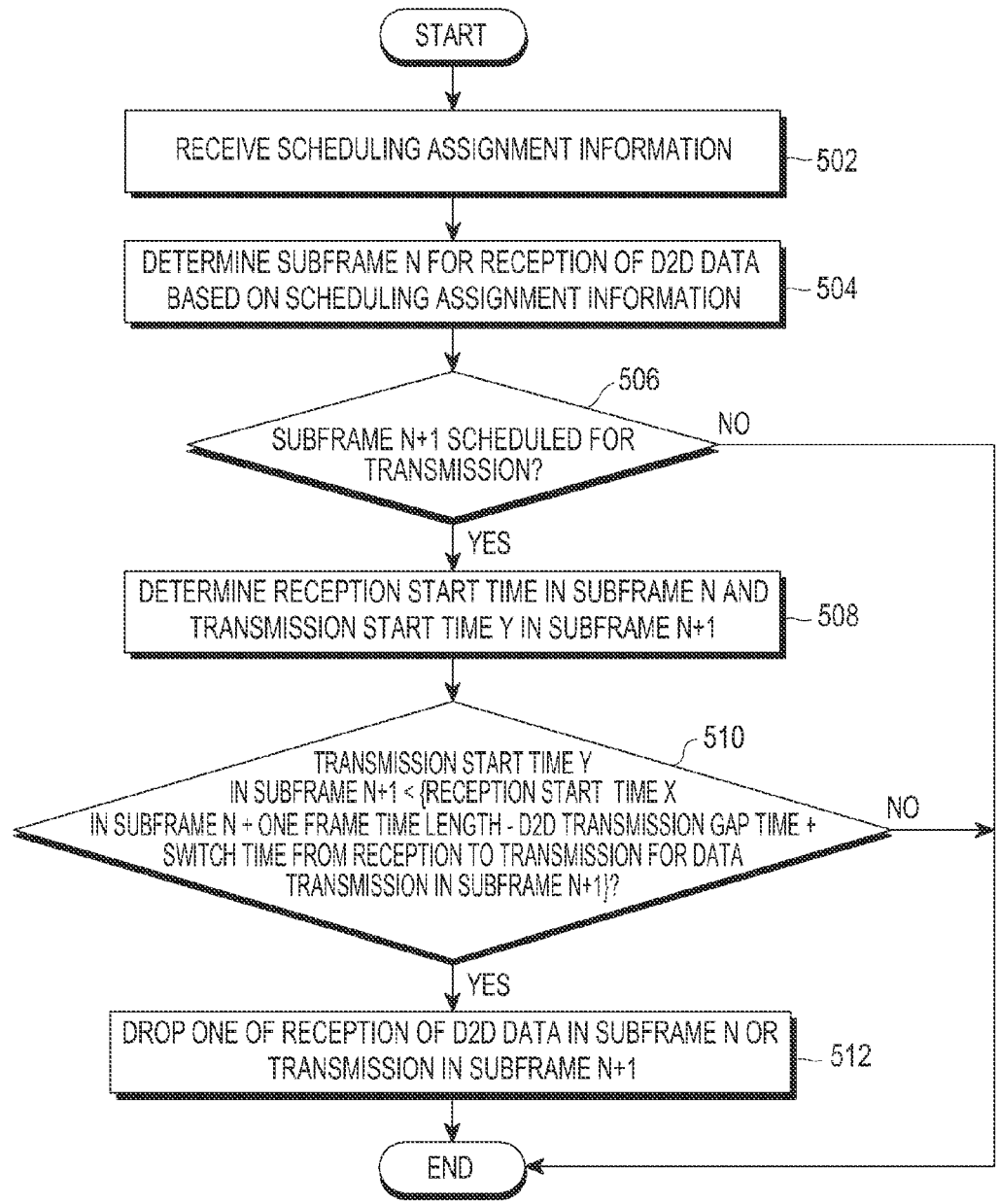
FIG. 5 illustrates a method for preventing overlap between reception and transmission of D2D data by a UE for D2D communication according to an embodiment of the present disclosure.

FIG. 5 illustrates a method for preventing overlap between reception and transmission of D2D data by a UE for D2D communication according to an embodiment of the present disclosure.

Transmission by a UE 202 includes one of transmission of D2D data, uplink transmission to the BS, and transmission of a D2D discovery signal.

Referring to FIG. 5, in operation 502, the UE 202 receives SA information for reception of D2D data from the BS. In an embodiment of the present disclosure, operation 502 may be performed by the communication unit 210.

In operation 504, the UE 202 determines subframe n for reception of D2D data based on the SA information. In operation 506, the UE 202 determines whether subframe n+1 is scheduled for transmission.

When subframe n+1 is scheduled for transmission, the UE 202 determines a reception start time X 115 in subframe n and a transmission start time Y 119 in subframe n+1 in operation 508. In operation 510, the UE 202 determines whether transmission start time Y 119 in subframe n+1 is less than {reception start time X 115 in subframe n+one frame time length−D2D transmission gap time+switch time from reception to transmission for data transmission in subframe n+1}.

When transmission start type Y 119 is determined in operation 510 to be less than transmission start time Y 119 in subframe n+1 is less than {reception start time X 115 in subframe n+one frame time length−D2D transmission gap time+switch time from reception to transmission for data transmission in subframe n+1}, the UE 202 drops one of the reception of D2D data in subframe n or transmission in subframe n+1 in operation 512.

In an embodiment of the present disclosure, operations 504 to 512 of the method may be performed by the controller 206.

Various operations, executions, or blocks of the method may be performed in the suggested order or a different order or simultaneously. Further, in some embodiments of the present disclosure, some operations, executions, or blocks may be omitted, added or modified without departing from the scope of the present disclosure.

Figure 6:
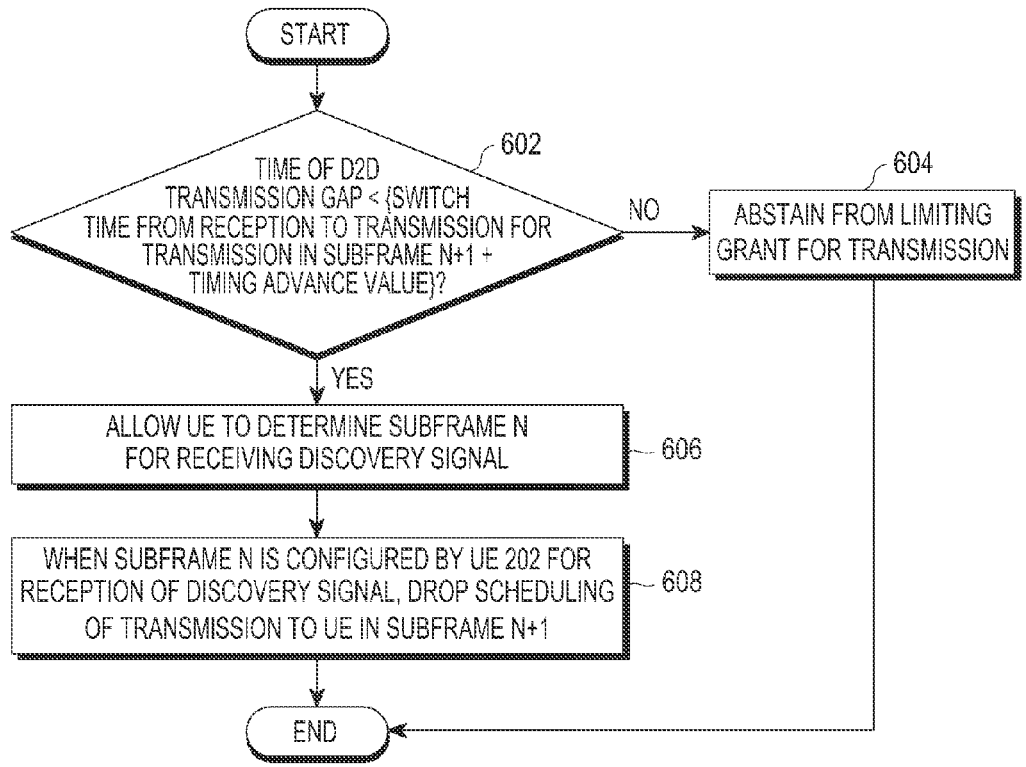
FIG. 6 illustrates a method for a base station to prevent overlap between reception and transmission by a UE during D2D communication according to an embodiment of the present disclosure.

FIG. 6 illustrates a method for a BS to prevent overlap between reception and transmission by a UE during D2D communication according to an embodiment of the present disclosure.

Referring to FIG. 6, in operation 602, a BS 204 determines whether the time of a D2D transmission gap is less than {switch time from reception to transmission for transmission in subframe n+1+TA value}.

Unless the time of a D2D transmission gap is less than {switch time from reception to transmission for transmission in subframe n+1+TA value}, the BS 204, in operation 604, abstains from limiting a grant for transmission. The transmission may include one of transmission of D2D data or uplink transmission to the BS.

When the time of a D2D transmission gap is less than {switch time from reception to transmission for transmission in subframe n+1+TA value}, the BS 204, in operation 606, may allow the UE 202 to determine subframe n in which the discovery signal is received.

In an embodiment of the present disclosure, the BS 204 determines subframe n by determining a subframe configured so that the UE 202 monitors discovery transmissions from other UE(s) during D2D communication with the UE 202.

The BS 204, when the UE 202 starts to monitor discovery transmissions from other UE(s), receives a monitoring instruction from the UE 202. In response to the monitoring instruction, the BS 204 transmits an indication for particular subframe(s) to the UE 202 to monitor discovery transmissions from other UE(s).

Alternatively, all of the subframes indicated in a discovery reception pool for the UE 202 through broadcast or dedicated signaling may be subframes where the UE 202 monitors discovery transmissions from other UE(s).

In operation 608, when subframe n is configured by the UE 202 to receive a discovery signal, scheduling of transmission to the UE 202 in subframe n+1 is dropped. In an embodiment of the present disclosure, when transmission in subframe n has a higher priority than the reception of discovery signal by the UE 202 in subframe n, the BS 204 schedules transmission to the UE 202 in subframe n+1. For example, scheduling of a transmission of an HARQ acknowledge for DL data has a higher priority than receiving a discovery signal by the UE 202 in subframe n.

Various operations, executions, or blocks of the method may be performed in the suggested order or a different order or simultaneously. Further, in some embodiments of the present disclosure, some operations, executions, or blocks may be omitted, added or modified without departing from the scope of the present disclosure.

Figure 7:
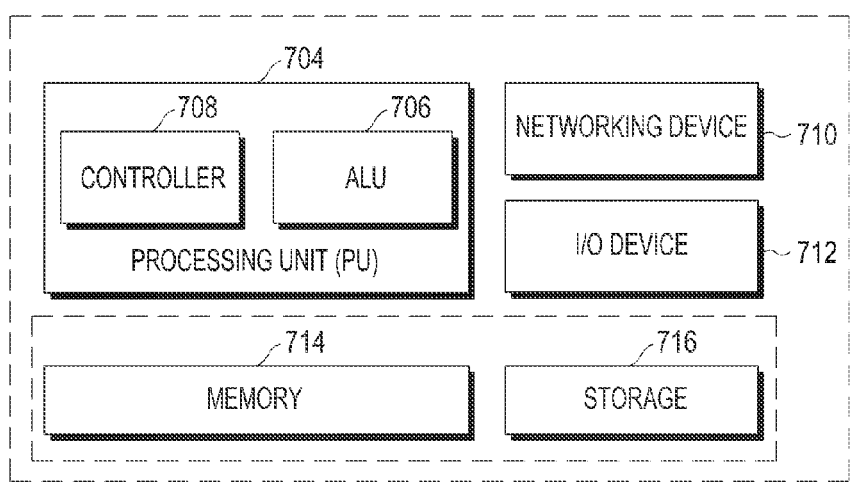
FIG. 7 illustrates a computing environment for implementing a method for preventing overlap between reception and transmission by a UE for D2D communication according to an embodiment of the present disclosure.

FIG. 7 illustrates a computing environment for implementing a method for preventing overlap between reception and transmission by a UE for D2D communication according to an embodiment of the present disclosure.

Referring to FIG. 7, a computing environment 702 includes at least one processing unit 704 having a controller 708 and an arithmetic logic unit (ALU) 706, a memory 714, a storage 716, a plurality of networking devices 710, and a plurality of input/output (I/O) devices 712. The processing unit 704 processes instructions of an algorithm. The processing unit 704 receives commands from the controller 708 and processes the commands. Further, any logic and arithmetic operations related to the execution of the instructions are computed with the aid of the ALU 706.

The overall computing environment 702 may include a plurality of homogeneous or heterogeneous cores, a plurality of different types of central processing units (CPUs), particular media, and other accelerators. The processing unit 704 may be in charge of processing instructions of an algorithm. Further, the plurality of processing units 704 may be positioned on a single chip or a plurality of chips.

An algorithm including instructions and codes necessary for the present implementation may be stored in either or both of the memory 714 and the storage 716. When executed, the instructions may be fetched from the memory 714 or storage 716 and may be executed by the processing unit 704.

As various networking devices 710 or external I/O devices 712 are connected to the computing environment, any hardware implementations may be supported through the networking units and/or I/O devices.

The various embodiments of the present disclosure disclosed herein may be implemented through at least one software program that is executed on at least one hardware device to control the components by performing network management functions. FIGS. 2 and 7 include blocks that may be at least one of a hardware device or a combination of a hardware device and a software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A communication method of a user equipment (UE) in a wireless communication system, the method comprising:
   determining whether uplink transmission in a subframe n+1 is to be overlapped in a time domain between data reception by the UE in a subframe n of a serving cell and data transmission by the UE in the subframe n+1 of the serving cell, the data reception for device-to-device (D2D) communication and the data transmission for uplink transmission to the serving cell; and
   dropping the data reception in the subframe n, if it is determined that the uplink transmission in the subframe n+1 is to be overlapped,
   wherein the determining of whether the uplink transmission in the subframe n+1 is to be overlapped comprises:
      if a time of a D2D transmission gap is less than a summation of a switch time from reception to transmission for the data transmission in the subframe n+1 and a timing advance for the transmission in the subframe n+1, determining that the uplink transmission in the subframe n+1 is to be overlapped, or
      if a transmission start time in the subframe n+1 is less than {a reception start time for reception of D2D data in the subframe n+a length of the subframe n−a D2D transmission gap time+a switch time from reception to transmission for the data transmission in the subframe n+1}, determining that the uplink transmission in the subframe n+1 is to be overlapped.

2. The method of claim 1, wherein the data reception comprises one of reception of D2D data or reception of a D2D discovery signal.

3. The method of claim 1, wherein the dropping of the data reception in the subframe n is determined depending on a priority between the data reception and the data transmission.

4. The method of claim 1, wherein the dropping of the data reception in the subframe n comprises dropping, if the data reception in the subframe n is reception of D2D data, and the data transmission in the subframe n+1 is uplink data transmission, the reception of the D2D data.

5. The method of claim 1, wherein the dropping of the data reception in the subframe n comprises dropping, if the data reception in the subframe n is reception of a D2D discovery signal, and the data transmission in the subframe n+1 is uplink data transmission, the reception of the D2D discovery signal.

6. A user equipment (UE) configured to prevent overlap between reception and transmission in a wireless communication system, the UE comprising:
   a controller configured to:
      determine whether uplink transmission in a subframe n+1 is to be overlapped in a time domain between data reception by the UE in a subframe n of a serving cell and data transmission by the UE in the subframe n+1 of the serving cell, the data reception for device-to-device (D2D) communication and the data transmission for uplink transmission to the serving cell, and
      drop the data reception in the subframe n, if it is determined that the uplink transmission in the subframe n+1 is to be overlapped,
   wherein the controller is further configured to:
      determine that the uplink transmission in the subframe n+1 is to be overlapped, if a time of a D2D transmission gap is less than a summation of a switch time from reception to transmission for the data transmission in the subframe n+1 and a timing advance for the transmission in the subframe n+1, or
      determine that the uplink transmission in the subframe n+1 is to be overlapped, if a transmission start time in the subframe n+1 is less than {a reception start time for reception of D2D data in the subframe n+a length of the subframe n−a D2D transmission gap time+a switch time from reception to transmission for the data transmission in the subframe n+1}.

7. The UE of claim 6, wherein the data reception comprises one of reception of D2D data or reception of a D2D discovery signal.

8. The UE of claim 6, wherein the controller is further configured to drop the data reception in the subframe n depending on a priority between the data reception and the data transmission.

9. The UE of claim 6, wherein the controller is further configured to drop, if the data reception in the subframe n is reception of D2D data, and the data transmission in the subframe n+1 is uplink data transmission, the reception of the D2D data.

10. The UE of claim 6, wherein the controller is further configured to drop, if the data reception in the subframe n is reception of a D2D discovery signal, and the data transmission in the subframe n+1 is uplink data transmission, the reception of the D2D discovery signal.

* * * * *